US012570505B2

(12) United States Patent
Boulliat

(10) Patent No.: US 12,570,505 B2
(45) Date of Patent: Mar. 10, 2026

(54) ROPE GRAB DEVICE FOR A PORTABLE POWER DRIVEN SYSTEM

(71) Applicant: SKYLOTEC GmbH, Neuwied (DE)

(72) Inventor: Claude Boulliat, Neuwied (DE)

(73) Assignee: SKYLOTEC GmbH, Neuwied (DE)

( * ) Notice: Subject to any disclaimer, the term of this patent is extended or adjusted under 35 U.S.C. 154(b) by 0 days.

(21) Appl. No.: 17/859,322

(22) Filed: Jul. 7, 2022

(65) Prior Publication Data

US 2023/0012442 A1     Jan. 12, 2023

(30) Foreign Application Priority Data

Jul. 8, 2021   (EP) ..................................... 21184588

(51) Int. Cl.
  *B66D 3/04*        (2006.01)
  *A62B 1/06*        (2006.01)
        (Continued)
(52) U.S. Cl.
  CPC .................. *B66D 3/04* (2013.01); *A62B 1/06* (2013.01); *A62B 1/18* (2013.01); *B66D 3/20* (2013.01);
        (Continued)
(58) Field of Classification Search
  CPC .. B66D 1/7415; B66D 1/7426; B66D 1/7447; B66D 1/7489; B66D 1/12; B66D 1/14;
        (Continued)

(56) References Cited

U.S. PATENT DOCUMENTS 462,501   A  *  11/1891   McCabe .................. B66D 3/06
                                                      254/399
2,151,338 A  *   3/1939   Shonnard ................ B66D 3/22
                                                      254/350
        (Continued)

FOREIGN PATENT DOCUMENTS

CN      105480885 A  *  4/2016   ............... B66D 1/36
DE      12 18 681        6/1966
        (Continued)

OTHER PUBLICATIONS

Extended European Search Report for corresponding EP Application No. 21184588.8, dated Jan. 10, 2022, 7 pages.
        (Continued)

*Primary Examiner* — Anna M Momper
*Assistant Examiner* — Henrix Soto
(74) *Attorney, Agent, or Firm* — Dority & Manning, P.A.

(57)        ABSTRACT

A rope grab device for a portable power driven system adapted for advancing a rope includes an essentially circular rope grab, wherein the rope grab is adapted to, during operation, engage the rope along at least a section of a circumference of the rope grab. The rope grab device also includes a securing device comprising a lever portion, a first roller arranged at one end of the lever portion and an anchoring point arranged at the opposite end of the lever portion adapted for receiving an anchoring force. The lever portion is attached with a hinged connection and is adapted to, by means of the first roller, exert a pressure to the rope for forcing the rope towards the rope grab at a portion of the section where the rope, during operation, is engaging the rope grab upon applying the anchoring force on the anchoring point.

12 Claims, 5 Drawing Sheets

(51) Int. Cl.
    *A62B 1/18*        (2006.01)
    *B66D 3/20*        (2006.01)
    *F16H 55/17*      (2006.01)

(52) U.S. Cl.
    CPC ....... *F16H 55/17* (2013.01); *B66D 2700/026*
    (2013.01)

(58) Field of Classification Search
    CPC . B66D 1/28; B66D 1/365; B66D 3/04; B66D
        3/20; B66D 2700/0125; B66D 2700/026;
        A62B 1/06; A62B 1/10; A62B 1/18;
        F16H 55/17
    USPC ........................................................ 254/390
    See application file for complete search history.

(56) References Cited

U.S. PATENT DOCUMENTS

| | | | | |
|---|---|---|---|---|
| 2,802,636 | A * | 8/1957 | Sandford | B66D 1/7415 |
| | | | | 24/135 R |
| 3,034,767 | A * | 5/1962 | Gordon | A01K 73/06 |
| | | | | 43/4.5 |
| 3,078,074 | A * | 2/1963 | Benedict | B66D 1/7415 |
| | | | | 226/193 |
| 3,375,725 | A * | 4/1968 | Robert, V | F16H 55/38 |
| | | | | 474/164 |
| 3,729,173 | A * | 4/1973 | Levardon | B66D 1/7415 |
| | | | | 254/333 |
| 3,819,155 | A * | 6/1974 | Smith | A01K 91/06 |
| | | | | 254/371 |
| 4,058,294 | A | 11/1977 | Dressler | |
| 4,316,602 | A * | 2/1982 | Desplats | B66D 1/58 |
| | | | | 104/173.1 |
| 4,511,122 | A * | 4/1985 | Svendsen | A01K 73/06 |
| | | | | 254/394 |
| 4,555,091 | A * | 11/1985 | May | B66D 1/7415 |
| | | | | 188/65.1 |
| 5,205,219 | A * | 4/1993 | Groskreutz | B61B 11/002 |
| | | | | 104/173.2 |
| 5,271,608 | A * | 12/1993 | Kubono | B66D 1/7415 |
| | | | | 254/269 |
| 5,402,985 | A * | 4/1995 | Owens | B66D 1/7415 |
| | | | | 254/333 |
| 6,247,680 | B1 * | 6/2001 | Cohen | B66D 1/7415 |
| | | | | 254/333 |
| 6,394,421 | B1 * | 5/2002 | Henly | B66D 1/72 |
| | | | | 254/365 |
| 7,513,334 | B2 * | 4/2009 | Calver | B66D 1/7415 |
| | | | | 182/133 |
| 9,790,064 | B2 * | 10/2017 | Timmermans | A63B 29/00 |
| 2013/0240810 | A1 * | 9/2013 | Skyba | B66D 1/7415 |
| | | | | 254/333 |
| 2017/0107086 | A1 | 4/2017 | Boulliat | |

FOREIGN PATENT DOCUMENTS

| | | | | |
|---|---|---|---|---|
| DE | 19510350 A1 * | 9/1996 | .......... | B66D 1/7415 |
| DE | 102012100099 A1 * | 7/2013 | .......... | B66D 1/7415 |
| EP | 677480 A1 * | 10/1995 | .......... | B66D 1/7415 |
| FR | 2 233269 | 1/1975 | | |
| GB | 772 553 A | 4/1957 | | |
| GB | 2041867 A * | 9/1980 | .......... | B66D 1/7415 |
| JP | 4011599 B2 | 11/2007 | | |
| WO | WO 2004/081409 | 9/2004 | | |
| WO | WO 2015/155082 | 10/2015 | | |
| WO | WO-2015156695 A1 * | 10/2015 | .......... | B66D 1/7489 |
| WO | WO 2020/209783 | 10/2020 | | |
| WO | WO2020/209783 A1 | 10/2020 | | |

OTHER PUBLICATIONS

Japanese Office Action (w/ Partial English Translation) for corresponding Application No. 2022-110650, dated May 28, 2024, 12 pages.

* cited by examiner

ROPE GRAB DEVICE FOR A PORTABLE POWER DRIVEN SYSTEM

CROSS-REFERENCE TO RELATED APPLICATIONS

This application is based upon and claims the right of priority to EP patent application Ser. No. 21/184,588.8, filed Jul. 8, 2021, the disclosure of which is hereby incorporated herein by reference in its entirety for all purposes.

TECHNICAL FIELD

The invention relates to a rope grab device for a portable power driven system, the portable power driven system adapted for advancing a rope, the rope grab device comprising an essentially circular rope grab, wherein the rope grab is adapted to, during operation, engage the rope along at least a section of a circumference of the rope grab.

BACKGROUND ART

Powered personal lifting devices assist personnel in scaling vertical surfaces. Motorized winches are used to raise or lower personnel on platforms or harnesses attached to ropes. A winch must be anchored to a solid platform above the load or use pulleys coupled to the platform to hoist the load. Further, a winch winds the rope or cable on a spool which limits the length and weight of rope that can be used. Hoists, usually with compound pulleys or reducing gears are used to raise or lower individuals or platforms and must be suspended from a secure support point such as a tripod, beam or bridge crane. Typically a winch or hoist requires at least a second person to operate or control the device in order for a first person to safely ascend a rope.

There are however many examples of where it would be desirable to have access to a portable winch, preferable for a portable winch that can be operated by the person ascending or descending the rope. Such scenarios include for example mountain climbing, caving, tree trimming, rescue operations and military operations. Industrial uses of a climbing device may include scaling tall structures, towers, poles, mine shafts or bridge works for servicing, cleaning, window washing, painting, etc.

Even though prior art knows various very useful solution for rope access to heights, there is always an endeavour to introduce further improvements for the personnel utilizing the equipment. Specifically, there is a desire to minimize any risks when working at heights and/or to make the device smaller and more flexible to a type and/or thickness of rope used, thereby improving the environment for the user of such equipment.

SUMMARY OF INVENTION

It is therefore an object of the invention to provide an improved portable power driven system.

The object of the invention is solved by the features of the independent claim.

Thus, the object is solved by a rope grab device for a portable power driven system, the portable power driven system adapted for advancing a rope, the rope grab device comprising:

an essentially circular rope grab, wherein the rope grab is adapted to, during operation, engage the rope along at least a section of a circumference of the rope grab, and is preferably adapted to be connected to a drive shaft of a motor of the power driven system for rotation of the rope grab, and a securing device comprising a lever portion, a first roller arranged at one end of the lever portion for guiding an unloaded end of the rope and an anchoring point arranged at the opposite end of the lever portion adapted for receiving an anchoring force from a load connectable to the portable power driven system, wherein the lever portion is attached with a hinged connection arranged between the one end and the opposite end to the rope grab device and is adapted to, by means of the first roller, exert a pressure to the rope for forcing the rope towards the rope grab at a portion of the section where the rope, during operation, is engaging the rope grab upon applying the anchoring force on the anchoring point.

A key aspect of the proposed solution is that upon applying the anchoring force on the anchoring point the lever portion is swivelled and thereby presses via the first roller the rope towards the rope grab, thereby creating friction between the rope and the rope grab. Such way by rotating the rope grab via the motor, the load can be lifted. Summarized in other words the anchoring force created by the load creates friction between the rope and the rope grab such that the load can be lifted by the rope grab device respectively the portable power driven system. Therefore, the securing device provides pressure to the rope at a position where the rope and the rope grab engage, during operation, with each other, for achieving friction between the rope and the rope grab. This position of engagement between the rope and the rope grab is typically at a stress part of the rope at a portion of the circumference of the rope grab. In turn, the first roller of the securing device will provide the pressure/exert a force at a section of this position.

Within the context of the application, the term roller should be interpreted broadly, and may comprise any type of device that can rotate "along with the rope" at the same time as the pressure is provided between the rope and the rope grab. Accordingly, the first roller should preferably be configured to provide a pressure that still allows the first roller to rotate during operation (rotation of) the rope grab. As mentioned above, the motor is connected to the rope grab using the drive shaft. The expression "drive shaft" may include any mechanical implementation for transferring a rotational force from the motor to the rope grab. As such, the drive shaft may for example further include a gear arrangement or similar for adapting the rotational force to suit the rotational speed of the rope grab. The term rope is here used in its broader sense and is intended to include ropes, wires, belts, webbing, and cords of whatever nature or size suitable for engaging with the rope grab. As understood by this definition, the rope may have a circular, elliptic of essentially flat (e.g. rectangular) form. In another implementation rope grab is assembled from a plurality of identical segments, assembled together to form an equivalent of a single unit. Such segments may be made of metal or plastic. Advantages with such an implementation may in some cases relate to simplified manufacturing giving a decreased manufacturing cost.

According to a preferred implementation the lever portion comprises, between the one end and the opposite end, an essentially circular and/or concave shape oriented towards the rope grab. The lever portion can be provided as an arm, in particular as a curved arm, made for example of metal. The lever portion may be provided one piece or as two pieces for holding the first roller in between the two pieces.

In another preferred implementation the hinged connection is arranged essentially in the middle between the one end and the opposite end of the lever portion and/or the securing device is arranged adjacently to the rope grab. Preferably the hinged connection is connected to a main body of the rope grab device respectively the portable power driven system. The hinged connection may circumferentially cover around a third of a circumference of the rope grab.

According to a further preferred implementation the lever portion is attached with the hinged connection to the rope grab device to rotate clockwise or counter clockwise upon applying the anchoring force on the anchoring point. The rotational direction of the lever portion may depend of a direction of the rope. If the rope grab device is built mirrored, such that a dead rope comes out for example on a left side, then the lever portion would rotate clockwise. However, preferably the dead rope comes out on a right hand side is that such descending device design allows to hold the dead rope with a right hand. In addition, a user may hold the dead rope for control and balance with the right hand.

In another preferred implementation the rope grab device comprises a lid, which is attached to the rope grab device via the hinged connection, for covering at least the rope grab during operation. The lid, preferably provided as safety lid, can be configured to be arranged in a closed state to cover the rope grab during operation of the power driven system, and to be arranged in an opened state for allowing introduction of the rope to the robe grab. The lid can be provided as metal or plastic plate. Such a safety arrangement minimizes any risks of the user introducing e.g. a hand or similar, efficiently increasing the operational safety of the system.

According to a further preferred implementation the first roller comprises a cover overing a section of a circumference of the first roller facing away from the rope grab. Such cover provides guidance for the rope at first roller. The cover may comprise metal or plastic, and may be attached to the lever portion.

In another preferred implementation the rope grab comprises a rope engaging face having a concave form for engaging the rope and the rope engaging face is provided with a plurality of pins adapted to contact the rope along the section of the circumference of the rope grab engaging the rope during operation of the rope grab device. Due to the pins friction between the rope and the rope grab will be increased, thus increasing a range of useful ropes. In a preferred implementation the plurality of pins will at least partly penetrate the rope. The positioning of the pins within the rope engaging face of the rope grab may in some implementations be symmetrical, i.e. having a symmetrical distribution at the rope engaging face of the rope grab. However, it may also be possible to position the pins in any other way, typically taking into account an expected load provided to the portable power driven system. This will of course also be valid for determining the number of pins positioning within the rope engaging face of the rope grab.

In a preferred implementation, a length of the pins is selected to not fully pierce through the rope. Preferably, the length is configured such that they engage themselves in the full woven part of rope, belt, strip or hanger, however with a minimum penetration of the "core" of the rope. The general structure of a rope suitable for use with a portable power driven system as discussed above will be readily understood by the person skilled in the art.

In an implementation, the rope grab and the pins are manufactured from a metal material, preferably keep as light as possible for reducing the overall weight of the power driven system. However, within the concept of the invention, it may also be possible to manufacture the rope grab and/or the pins out of a resistant plastic material, such as for example being manufactured from a polyoxymethylene material. It is of course understood that other suitable plastic material having high resistance may be useable within the context of the invention.

The pins and the rope grab are preferably manufactured as a single unit. This may in some implementations be preferred due to cost of manufacturing. One possibility would for example be to manufacture the single unit rope grab from cast iron. Alternatively, the rope grab may be formed as one unit and the plurality of pins may be integrated with the rope grab, for example by insertion in holes formed at the engaging face of the rope grab.

Within the context of the invention, it may be possible to provide at least the engaging face of the rope grab with a rubber material or a similar equivalent, further improving the friction between the rope grab and the rope. The selection of material may be dependent on a possible temperature increase relating to the use of the additional e.g. rubber material when operating the portable power driven system.

According to a further preferred implementation the pins provided to penetrate the rope have an angled form with an angle between −45 to 45 degrees, −45 to 0 degrees or 0 to 45 degrees. The portion of the pin adapted to penetrate the rope is preferably configured to have an in comparison "pointy" end. In a preferred implementation, the outermost end of the pins adapted to penetrate the rope, sometimes denoted as the "attack front" of the pins, may preferably be configured to have a typical angle between-5-22 degrees, thereby giving less wear and tear of the rope. This may specifically be achieved by arranging the pins to be "rounded off" and has a beam between 0 to 0.5 mm. In a possible embodiment the pins have a diameter between 0.5 to 2.5 mm, preferably around 2 mm. In a possible implementation the spherical headland of the pins may, for example, have a radius around 0.5 mm and may be placed on the top of a cylinder of 1 mm of diameter and of 1 mm of length.

In another preferred implementation the rope grab device comprises a heel portion arranged adjacently to the first roller and partly extending into the rope engaging face of the rope grab for avoiding that the rope re-circles the rope grab. The heal portion is preferably attached to the main body and/or opposite to the lever portion with the rope grab in-between. The heal portion may comprise metal and/or plastic.

According to a further preferred implementation the rope grab device comprises a second roller for guiding a loaded end of the rope, wherein the second roller is preferably attached to a lever for loading the rope, and the rope grab is arranged essentially between the first roller, the second roller and/or the anchoring point. In another preferred implementation the second roller comprises a retractable axis and the lid comprises an opening engageable with the axis for fixing the lid in a closed position covering at least the rope grab. According to a further preferred implementation the rope grab device comprises a lid, which is attached to the rope grab device via the retractable axis, for covering at least the rope grab during operation. The lid can also attached to the lever for being folded away together with the second roller.

In another preferred implementation the securing device comprises a spring mechanism for forcing the first roller towards the rope grab. Such way the rope becomes clamped between the first roller and the rope grab after being inserted into the rope grab device.

The object is further solved by a portable power driven system for advancing a rope, the rope extending in a first main direction, the power driven system comprising:

a motor comprising a drive shaft; and a rope grab device as described before, wherein the rope grab is connected to the drive shaft of the motor for rotation of the rope grab and the anchoring force extends in a second direction being essentially opposite to the first main direction.

In an implementation there is further provided an elongated safety sling connected to the anchoring point, the safety sling arranged to receive at least one of a maillon, a carabiner, or a rigging plate. The sling may for example be of a textile material. The elongated sling is preferably at one of its ends connected to the anchoring point and configured to at its other end receive at least one of a maillon, a carabiner, or a rigging plate. The at least one of a maillon, a carabiner, or a rigging plate may then in turn be used for allowing connection of the portable system to e.g. a harness for a user, or for anchoring the system to a fixed structure using e.g. further climbing/fining equipment. The general term "elongated sling" is typically referred to as in relation to general climbing equipment. In addition, the term "textile" should be interpreted very broadly. For example, the textile material used for forming the sling may be of any type of e.g. woven or non-woven material, natural and/or synthetic fibers, etc. During operation of the portable power driven system, the user is typically securely connected to the above discussed anchoring point, e.g. by means of the sling and carabiner.

According to a further preferred implementation the portable power driven system comprises a centrifugal clutch and/or a worm drive connected between the motor and the rope grab. In a preferred implementation, the motor is an electrical motor, and the portable power driven system further comprises a gear arrangement connected in between the electrical motor and the rope grab, the gear arrangement configured to reduce a rotational speed of the rope grab as compared to a rotational speed of the motor. This will as a result increase the torque applied to the rope grab, thus making it possible to use a high speed motor with a low torque Preferably, the gear arrangement comprises the worm drive, and/or where the worm drive is configured to be self-locking. This has the advantages of not having to include a break mechanism with the portable power driven system, thus decreasing the cost and complexity of the portable power driven system.

When using a high speed motor with a low torque as discussed above, it is typically desirable to further include a centrifugal clutch connected between the motor and the gear arrangement. Such a centrifugal clutch will be used for compensation of the weakness of the motor torque at the start phase of the motor. The drive shaft may comprise a torque limiter comprising a spring that acts on a brake disc, which slides on the rope grab. When torque is low the drive shaft will may with the rope grab. If torque goes beyond a threshold, the rope grab may slip on a brake pad and save the gear arrangement. A user may also manually pull out safety pins to manually release the brake pad and lower themselves in case of system failure.

Besides that or in addition a friction torque limiter may be present in particular built into the rope grab. Such friction torque limiter is advantageous when having a gearbox with worm drive so that an emergency descend becomes possible if the motor fails.

BRIEF DESCRIPTION OF DRAWINGS

These and other aspects of the invention will be apparent from and elucidated with reference to the implementations described hereinafter.

In the drawings.

DESCRIPTION OF IMPLEMENTATIONS

Figure 1:
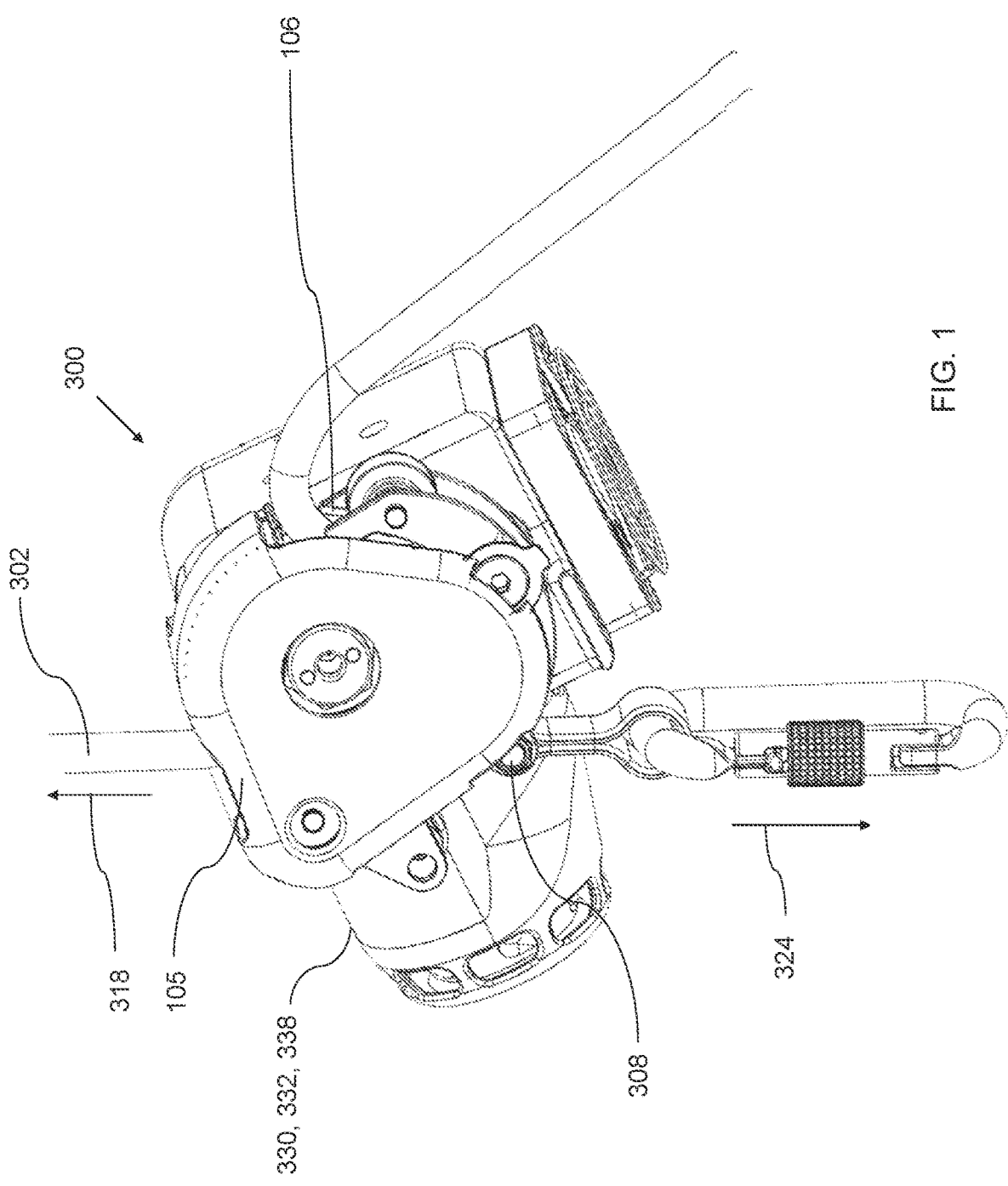
FIG. 1 shows a rope grab device for a portable power driven system in a perspective view according to a preferred implementation.

FIG. 1 shows a rope grab device for a portable power driven system 300 in a perspective view according to a preferred implementation provided with a rope grab 100 essentially provided as a wheel. The portable power driven system 300 is further provided with a securing device 301 configured to force a rope 302 towards the rope grab 100 at a portion of the section where the rope 302, during operation, is engaging the rope grab 100. The securing device 301 forms together with the rope grab 100 the rope grab device.

The securing device 301 comprises a lever portion 304 having an essentially circular and/or concave shape oriented towards the rope grab 100. The lever portion 304 is at one end provided with an anchoring point 308 for receiving an anchoring force from a load connectable to the portable power driven system 300. A first roller 314 is arranged at the other end of the first lever portion 304 for guiding an unloaded end of the rope 302. The lever portion 304 is attached with a hinged connection 310 arranged in particular in the middle between the one end and the opposite end to a main body 311 (typically including a "cover") of the portable power driven system 300 respectively of the rope grab device.

During operation, the rope 302 is inserted to engage with a portion of the rope grab 100, typically being in contact with around half of the circumference of the rope grab 100. The rope will in addition extend in a first main direction 318 and as such engage with a second roller 316 for guiding a loaded end of the rope 302, which is attached to the main body 311. Still further, the rope 302 will pass around a portion of the first roller 314. When operating the portable power driven system 300, the load will be connected to an anchoring point of the portable power driven system 300, in the Fig. coinciding with the first hinged connection 308. The anchoring point may be provided with for example a sling 321 in turn connected to a carabiner 322 for connecting to a harness of a user. The user will accordingly place a loading force 324 to the portable power driven system 300, where the loading force 324 will extend in an essentially opposite direction as compared to the main direction of the rope 302. The rope 302 will additionally have an unloaded end extending out from the first roller 314.

When loading the portable power driven system 300 respectively upon applying the anchoring force on the anchoring point 308, the lever portion 304 is swivelled counter clockwise with anchoring point 308 away from the rope grab 100 in a second direction 324 of the loading force 324. In turn, the first roller 314 is swivelled towards the rope grab 100 and thus exerts a pressure to the rope 302 for forcing the rope 302 towards the rope grab 100. The rope 302 becomes at least partly "clamped" between the first roller 314 and the rope grab 100. Accordingly, as a force is provided to the rope 302 at a portion of the rope grab 100 where the rope 302 during operation of the portable power driven system 300 is engaged, an increased friction between the rope 302 and the rope grab 100 is provided. This will allow for the use of a large variety of different types of ropes to be used with the portable power driven system 300.

Figure 3:
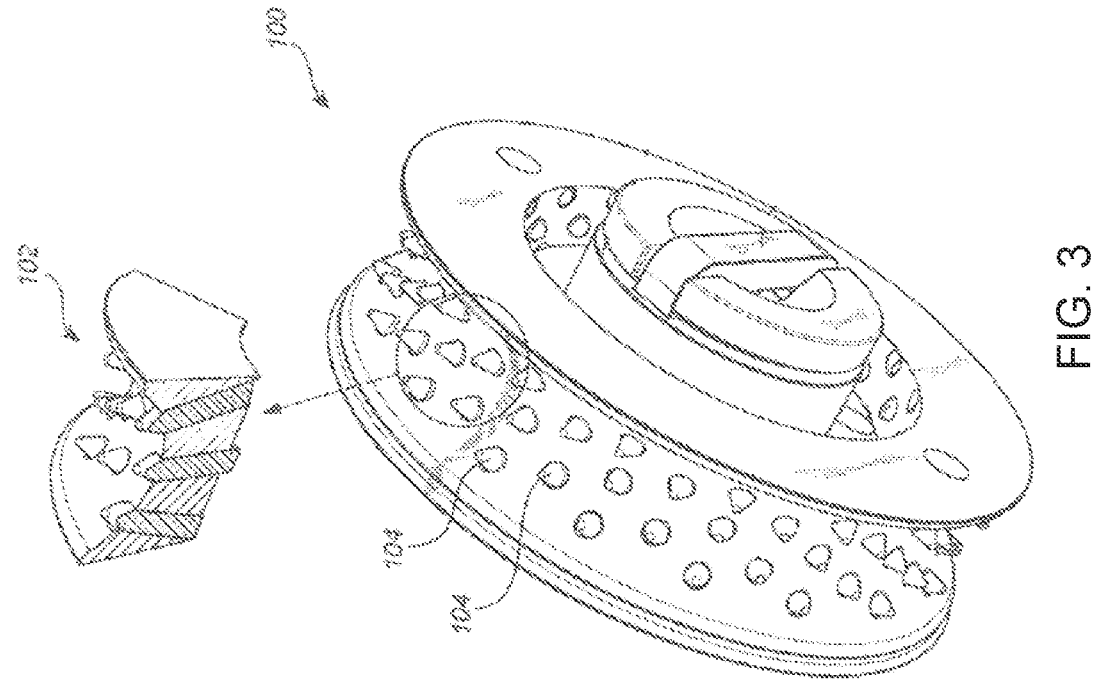
FIG. 3 shows a rope grab of the rope grab device for the portable power driven system of FIG. 1 in a perspective view according to the preferred implementation.
Figure 4:
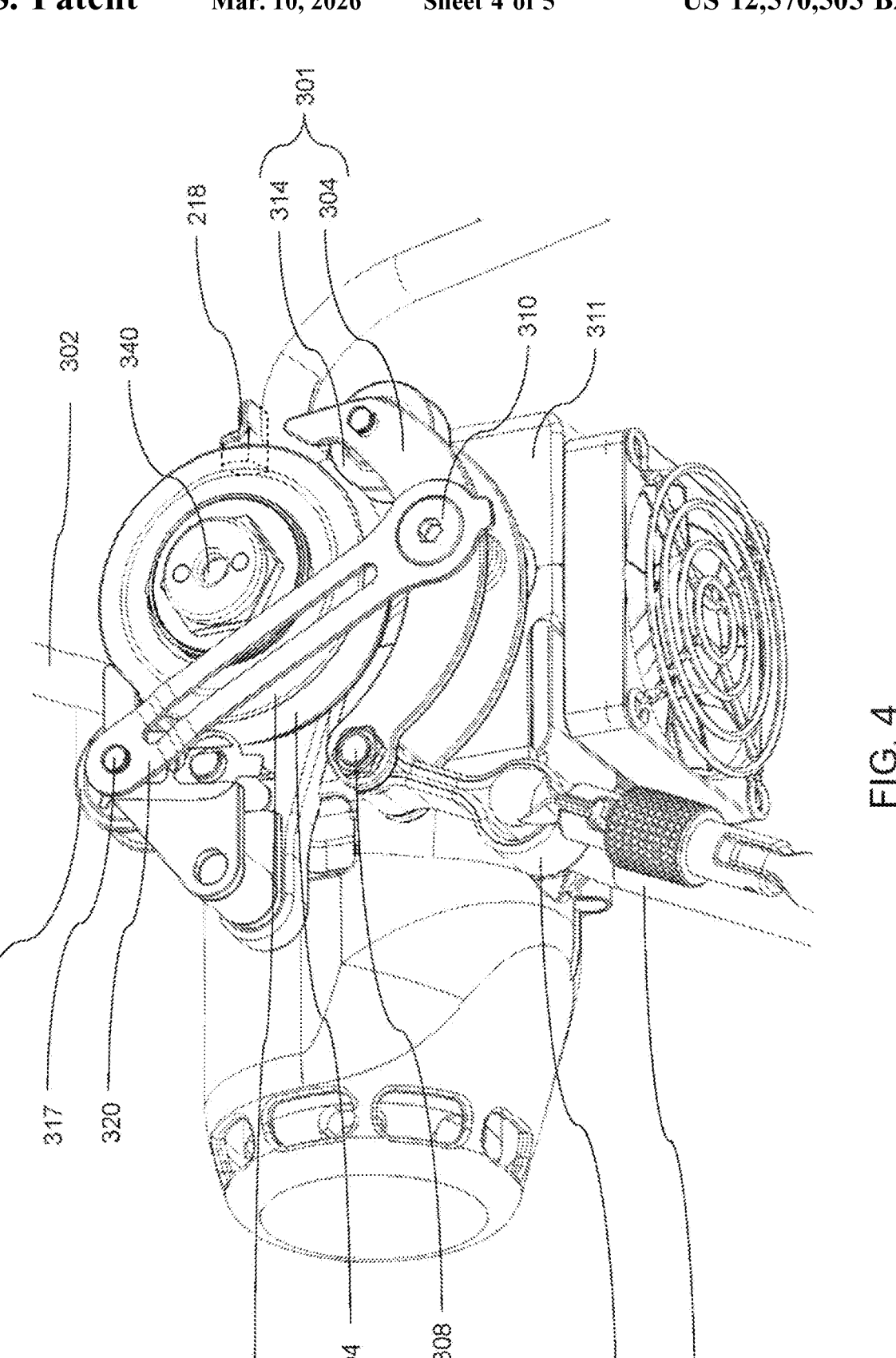
FIG. 4 is a perspective view of a rope grab device for a portable power driven system in accordance with an exemplary embodiment of the present disclosure.
Figure 5:
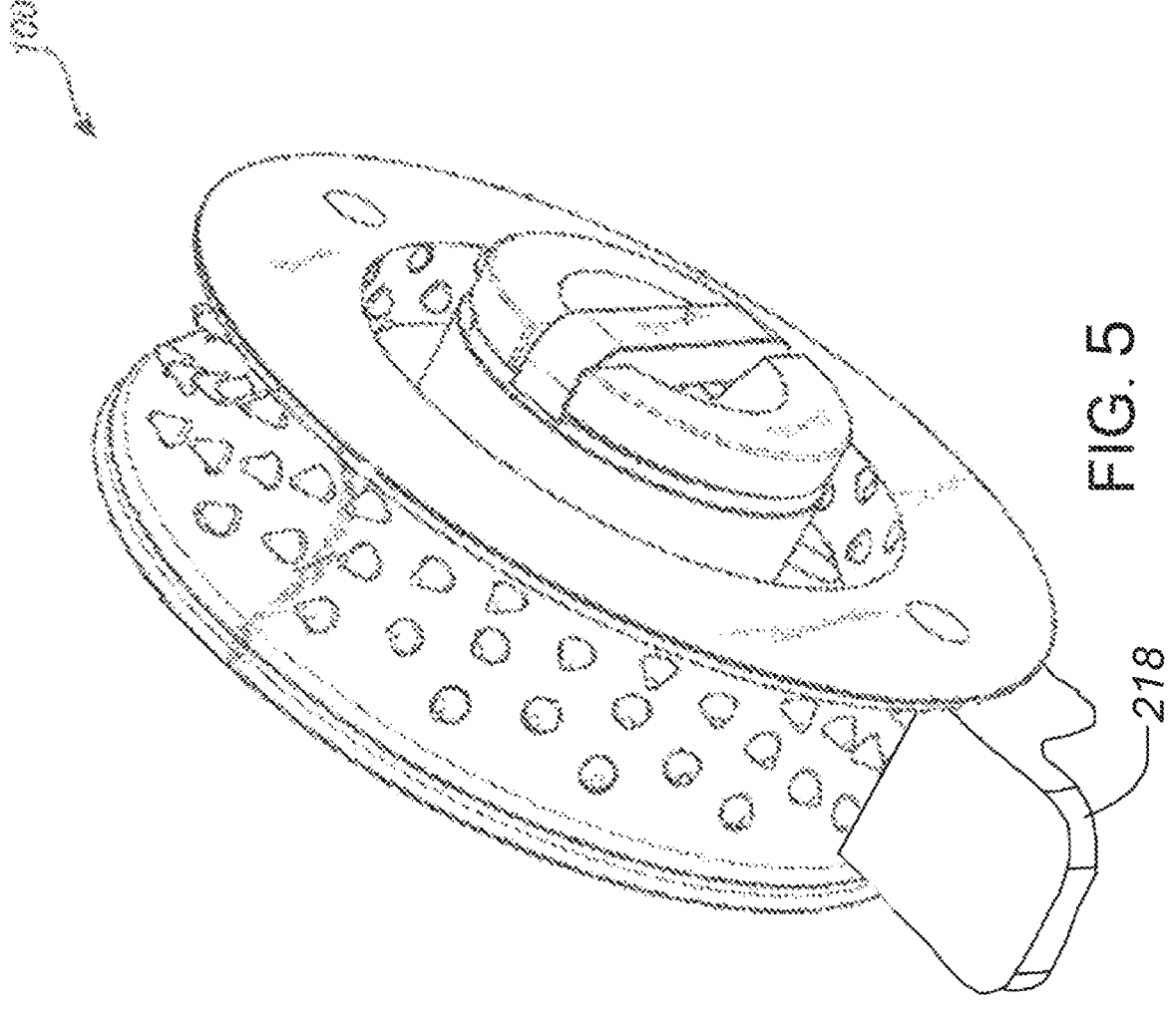
FIG. 5 is a perspective view of a rope grab of a rope grab device for a portable power driven system showing a heel portion partly extending into a rope engaging face of the rope grab in accordance with an exemplary embodiment of the present disclosure.

The rope grab 100 comprises an essentially circular shape with a rope engaging face 102 having a concave form for engaging the rope 302. The rope engaging face 102 is provided with a plurality of pins 104 adapted to contact the rope 302 along the section of the circumference of the rope grab 100 for engaging the rope 302 during operation of the rope grab device, as shown in more detail in FIG. 3. The pins 104 of the rope grab 100 are arranged in a "forward facing" and/or "backward facing" direction as compared to the rotational direction of the rope grab 100 when the portable power driven system 300 is to ascend along the rope 302. The pins 104 penetrating the rope 302 have an angled form with an angle between 0 to 45 degrees. This is a possible implementation of the rope grab 100 in relation to the pins 104, however, it may be possible to allow the pins 104 to be perpendicularly arranged in comparison to the rope engaging face 102 or the rope grab 100.

The rope grab 100 is connected to a drive shaft 340 of a motor 330 of the power driven system 300 for rotation of the rope grab 100. The motor 330 can be connected to a centrifugal clutch 332, thereby compensation of the weakness of the motor torque at the start phase of the motor 330. The motor 330 is an electrical motor being optimized to have an in comparison high speed and low torque when being operated. The centrifugal clutch 332 is in turn connected to a gear arrangement, preferably comprising a first and a second stage.

The first stage may be a general cog/wheel arrangement known in the art and second stage preferably comprise a worm drive 338. The worm drive 338 is preferably configured to be self-locking. This has the advantages of not having to include a break mechanism with the portable power driven system 300, thus decreasing the cost and complexity of the portable power driven system 300. The worm drive 338 is in turn connected to the drive shaft 340 for allowing connection to the rope grab 100.

Figure 2:
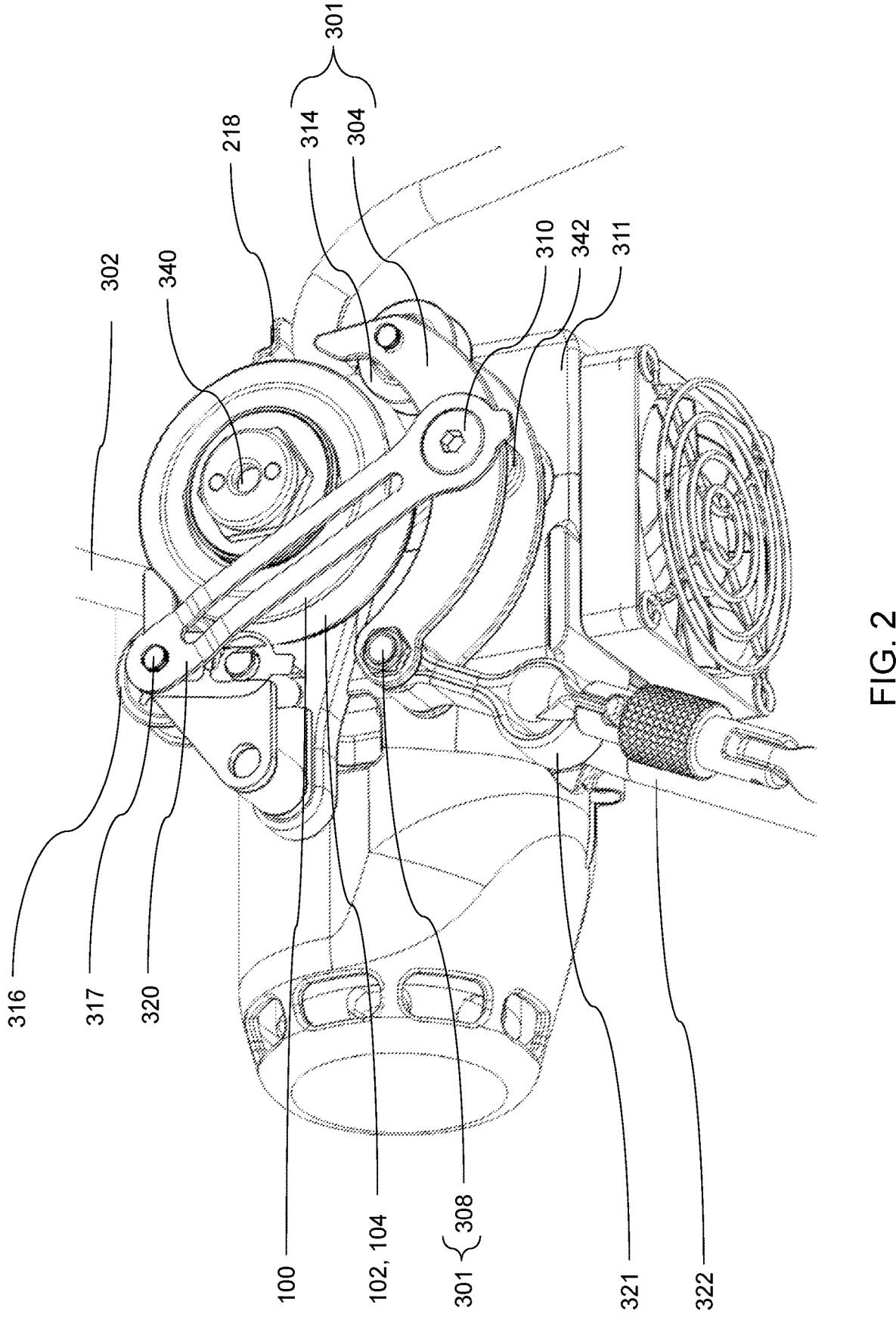
FIG. 2 shows the rope grab device for the portable power driven system of FIG. 1 with a lid removed in a perspective view according to the preferred implementation.

The rope grab device comprises a lid 105 as shown in FIG. 1, while removed in FIG. 2, which is attached to the rope grab device via an axis 317 of the second roller 316 or alternative via the hinged connection 310, for covering at least the rope grab 100 during operation. The lid 105, comprising metal and/or plastic, is attached swivelling via the axis 317 or the hinged connection 310. Axis 317, respectively hinged connection 310, may be provided retractable such that an opening 106 of the lid 105 can be engaged with the axis 317 for fixing the lid 105 in a closed position covering at least the rope grab 100. The rope grab device may further comprises a heel portion 218 arranged adjacently to the first roller 314 and partly extending into the rope engaging face 102 of the rope grab 100. The heel portion 218 avoids that the rope 302 re-circles the rope grab 100. The second roller 316 may be attached to a lever, not shown, for loading the rope 302. Further, a spring can be provided for forcing the first roller 314 towards the rope grab. Even further, for improving stability of the before described lever portion 304 mechanism, a metal roller connector 320 connects the second roller 316 and the lever portion 304 the axis 317 of the second roller 316 and the hinged connection 310 such that the rope grab 100 is axially arranged between the metal connector 320 and the main body.

While the invention has been illustrated and described in detail in the drawings and foregoing description, such illustration and description are to be considered illustrative or exemplary and not restrictive; the invention is not limited to the disclosed implementations. Other variations to be disclosed implementations can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 100 rope grab
102 rope engaging face
104 pin
105 lid
106 opening
218 heel portion
300 portable power driven system
301 securing device
302 rope
304 lever portion
308 anchoring point
310 hinged connection
311 main body
314 first roller
316 second roller
317 axis
318 first main direction
320 roller connector
321 sling
322 carabiner
324 second direction
330 motor
332 centrifugal clutch
338 worm drive
340 drive shaft

The invention claimed is:
1. A rope grab device for a portable power driven system, the portable power driven system adapted for advancing a rope, the rope grab device comprising:
an essentially circular rope grab, wherein the rope grab is adapted to, during operation, engage the rope along at least a section of a circumference of the rope grab and the rope grab comprises a rope engaging face including a concave surface that curves inwards from outer edge flanges, the concave surface is configured to engage the rope and the concave surface includes a plurality of pins adapted to contact the rope along the section of the circumference of the rope grab engaging the rope during operation of the rope grab device, a securing device comprising a lever portion, a first roller arranged at one end of the lever portion for guiding an unloaded end of the rope and an anchoring point arranged at the opposite end of the lever portion adapted for receiving an anchoring force from a load connectable to the portable power driven system, wherein the lever portion is attached with a hinged connection arranged between the one end and the opposite end to the rope grab device and is adapted to, by the first roller, exert a pressure to the rope for forcing the rope towards the rope grab at a portion of the section where the rope, during operation, is engaging the rope grab upon applying the anchoring force on the anchoring point, a heel portion arranged adjacently to the first roller, the heel portion having a maximum thickness side, whereby the maximum thickness side of the heel portion extends past the outer edge flanges towards the concave surface of the rope engaging face for preventing the rope from re-circling the rope grab, wherein the heel portion comprises:

a body portion, wherein the body portion extends past the outer edge flanges towards the concave surface of the rope engaging face for preventing the rope from recircling the rope grab; and a flange portion having a first side and a second side opposite the first side, wherein the first side of the flange portion extends past the outer edge flanges towards the concave surface of the rope engaging face for preventing the rope from re-circling the rope grab, wherein the second side of the flange portion extends away from the rope grab and beyond the body portion, and wherein the body portion and the flange portion together define the maximum thickness side of the heel portion, and a second roller for guiding a loaded end of the rope, whereby the rope grab is arranged essentially between at least two of the first roller, the second roller and/or the anchoring point.

2. The rope grab device according to claim 1, wherein the lever portion comprises, between the one end and the opposite end, at least one of an essentially circular and concave shape oriented towards the rope grab.

3. The rope grab device according to claim 1, wherein the hinged connection is arranged essentially in the middle between the one end and the opposite end of the lever portion.

4. The rope grab device according to claim 1, wherein the lever portion is attached with the hinged connection to the rope grab device to rotate clockwise or counter clockwise upon applying the anchoring force on the anchoring point.

5. The rope grab device according to claim 1, wherein the rope grab device comprises a lid, which is attached to the rope grab device via the hinged connection, for covering at least the rope grab during operation.

6. The rope grab device according to claim 1, wherein the pins provided to penetrate the rope have an angled form with an angle between-45 to 45 degrees.

7. The rope grab device according to claim 1, wherein the rope grab device comprises a roller connector connecting the second roller and the lever portion via an axis of the second roller and the hinged connection.

8. The rope grab device according to claim 1, wherein the rope grab device comprises a lid, which is attached to the rope grab device via the retractable axis, for covering at least the rope grab during operation, and wherein the second roller comprises a retractable axis and the lid comprises an opening engageable with the retractable axis for fixing the lid in a closed position covering at least the rope grab.

9. The rope grab device according to claim 1, wherein the rope grab device comprises a lid, which is attached to the rope grab device via the retractable axis, for covering at least the rope grab during operation.

10. The rope grab device according to claim 1, wherein the securing device comprises a spring mechanism for forcing the first roller towards the rope grab.

11. A portable power driven system for advancing a rope, the rope extending in a first main direction, the power driven system comprising:

a motor comprising a drive shaft; and a rope grab device according to claim 1, wherein the rope grab is connected to the drive shaft of the motor for rotation of the rope grab and the anchoring force extends in a second direction being essentially opposite to the first main direction.

12. The rope grab device according to claim 1, wherein the securing device is arranged adjacently to the rope grab.

* * * * *